(12) United States Patent
Moriwaki et al.

(10) Patent No.: US 11,761,973 B2
(45) Date of Patent: *Sep. 19, 2023

(54) LIQUID SURFACE IMAGING DEVICE AND LIQUID DISCHARGE APPARATUS

(71) Applicant: RICOH COMPANY, LTD., Tokyo (JP)

(72) Inventors: Yuta Moriwaki, Tokyo (JP); Atsushi Yamamoto, Tokyo (JP); Taku Hatakeyama, Kanagawa (JP); Takashi Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 422 days.

This patent is subject to a terminal disclaimer.

(21) Appl. No.: 17/004,684

(22) Filed: Aug. 27, 2020

(65) Prior Publication Data

US 2021/0063427 A1    Mar. 4, 2021

(30) Foreign Application Priority Data

Sep. 4, 2019 (JP) ................................. 2019-161268

(51) Int. Cl.
  *B41J 2/165* (2006.01)
  *G01N 35/10* (2006.01)
  *B41J 2/135* (2006.01)

(52) U.S. Cl.
  CPC .......... *G01N 35/1011* (2013.01); *B41J 2/135* (2013.01); *G01N 2035/1023* (2013.01)

(58) Field of Classification Search
  CPC ....... G01N 35/1011; G01N 2035/1023; G01N 2035/1025; B41J 2/135; B41J 2/16579; B41J 2202/38

USPC ........ 73/168, 864, 865.8, 865.9; 348/86, 88, 348/94, 95, 96, 125, 129, 128; 356/601, 356/612, 625

See application file for complete search history.

(56) References Cited

U.S. PATENT DOCUMENTS

| 11,312,150 B2 * | 4/2022 | Moriwaki ............ B41J 2/16585 |
| 2013/0194346 A1 | 8/2013 | Moriwaki |
| 2014/0009531 A1 | 1/2014 | Kaneko et al. |
| 2014/0063121 A1 | 3/2014 | Moriwaki et al. |
| 2014/0152745 A1 | 6/2014 | Park et al. |
| 2014/0265106 A1 | 9/2014 | Saitoh et al. |
| 2015/0077478 A1 | 3/2015 | Kawabata et al. |

(Continued)

FOREIGN PATENT DOCUMENTS

| JP | 2005161838 | * | 6/2005 |
| JP | 3142994 U | | 7/2008 |

(Continued)

OTHER PUBLICATIONS

Office Action dated May 30, 2023 in Japanese Patent Application No. 2019-161268, 7 pages.

*Primary Examiner* — Robert R Raevis
(74) *Attorney, Agent, or Firm* — XSENSUS LLP

(57) ABSTRACT

A liquid surface imaging device includes an irradiator including a plurality of lightings, the irradiator configured to irradiate a liquid surface in a nozzle of a liquid discharge head with lights emitted from the plurality of lightings, and an imaging device configured to image the liquid surface. The plurality of lightings is arranged point-symmetrically with a center of the irradiator as a point of symmetry.

17 Claims, 18 Drawing Sheets

(56) References Cited

U.S. PATENT DOCUMENTS

| | | |
|---|---|---|
| 2016/0129693 A1 | 5/2016 | Moriwaki et al. |
| 2017/0106655 A1 | 4/2017 | Moriwaki et al. |
| 2018/0147854 A1 | 5/2018 | Yoshida et al. |
| 2018/0339519 A1 | 11/2018 | Katoh et al. |
| 2018/0370245 A1 | 12/2018 | Moriwaki |
| 2019/0232676 A1 | 8/2019 | Kubodera et al. |
| 2021/0060968 A1* | 3/2021 | Moriwaki ............ B41J 2/16579 |

FOREIGN PATENT DOCUMENTS

| | | |
|---|---|---|
| JP | 2013-052616 | 3/2013 |
| JP | 2016-099405 A | 5/2016 |

* cited by examiner

LIQUID SURFACE IMAGING DEVICE AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2019-161268, filed on Sep. 4, 2019, in the Japan Patent Office, the entire disclosures of which is hereby incorporated by reference herein.

BACKGROUND

Technical Field

Aspects of the present disclosure relate to a liquid surface imaging device and a liquid discharge apparatus.

Related Art

In a nozzle from which a liquid is discharged, a state of a liquid surface of the liquid in the nozzle affects discharge characteristics of a liquid discharge head that includes the nozzle to discharge the liquid.

A method to detect a nozzle state of the liquid discharge head includes a step that applies a first drive voltage to an actuator to discharge a first droplet, a step that applies a second drive voltage to the actuator to discharge a second droplet in a state in which meniscus formed in the nozzle is protruded in a direction toward the nozzle opposite to a liquid chamber after the first droplet is discharged from the nozzle, and a step that detects a discharge direction of the second droplet from the nozzle with a discharge direction detector.

SUMMARY

In an aspect of this disclosure, a liquid surface imaging device includes an irradiator including a plurality of lightings, the irradiator configured to irradiate a liquid surface in a nozzle of a liquid discharge head with lights emitted from the plurality of lightings, and an imaging device configured to image the liquid surface. The plurality of lightings is arranged point-symmetrically with a center of the irradiator as a point of symmetry.

In another aspect of this disclosure, a liquid surface imaging device includes an irradiator including a ring-shaped lighting, the irradiator configured to irradiate a liquid surface in a nozzle of a liquid discharge head with light emitted from the belt-shaped lighting, and an imaging device configured to image the liquid surface. The belt-shaped lighting has a shape point-symmetrically with a center of the irradiator as a point of symmetry.

BRIEF DESCRIPTION OF THE SEVERAL VIEWS OF THE DRAWINGS

The aforementioned and other aspects, features, and advantages of the present disclosure will be better understood by reference to the following detailed description when considered in connection with the accompanying drawings, wherein.

Figure 1A:
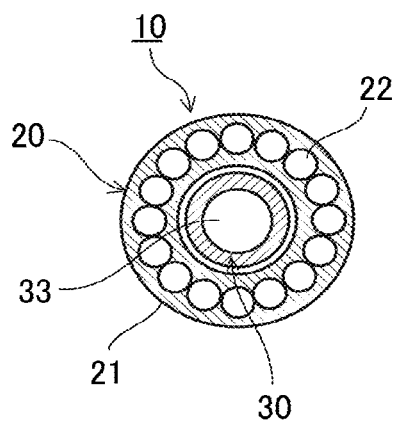
FIGS. 1A and 1B are schematic plan view and a cross-sectional front view, respectively, of a liquid surface imaging device according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable. As used herein, the singular forms "a," "an," and "the" are intended to include the plural forms as well, unless the context clearly indicates otherwise.

Figure 1B:
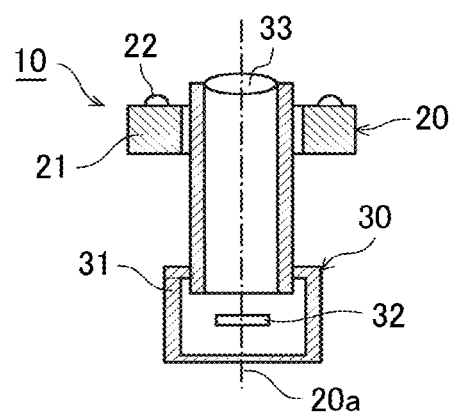
Figure 2:
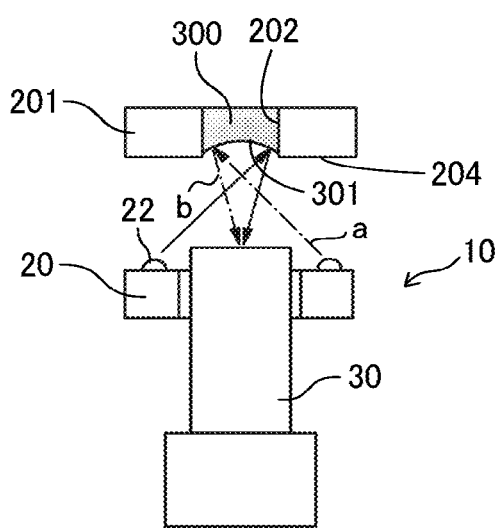
FIG. 2 is a schematic cross-sectional front view of the liquid surface imaging device when the liquid surface imaging device images a liquid surface in a nozzle of a liquid discharge head.

Embodiments of the present disclosure are described below with reference to the attached drawings. A first embodiment of the present disclosure is described with reference to FIGS. 1 and 2. FIG. 1A is a schematic plan view of a liquid surface imaging device 10 according to the first embodiment of the present disclosure. FIG. 1B is a schematic cross-sectional front view of the liquid surface imaging device 10 of FIG. 1 according to the first embodiment of the present disclosure. FIG. 2 is a schematic cross-sectional front view of the liquid surface imaging device 10 when the liquid surface imaging device 10 images a liquid surface 301 in the nozzle 202 of a liquid discharge head 200.

The liquid surface imaging device 10 includes an irradiator 20 and an imaging device 30. The irradiator 20 includes a plurality of lightings 22 to irradiate a liquid surface 301 (meniscus surface) of a liquid 300 held inside a nozzle 202 (see FIG. 2). The nozzle 202 is formed in a nozzle plate 201 (see FIG. 2) of a liquid discharge head 200 (see FIG. 31). The imaging device 30 images the liquid surface 301 of the liquid 300 in the nozzle 202. Hereinafter, the liquid discharge head 200 is simply referred to as a "head 200."

The irradiator 20 includes the plurality of lightings 22 that are arranged annularly in a holder 21. The plurality of lightings 22 is arranged point-symmetrically with a center 20a (optical axis) as a point (center) of symmetry when the irradiator 20 is viewed in an irradiation direction (viewed in a vertical direction from above in FIG. 1B). The center 20a is a center of the imaging device 30 in the first embodiment of the present disclosure. If the imaging device 30 includes a lens 33, the center 20a and the optical axis can also be referred to as "a symmetry axis passing through a center of the lens 33 (optical imaging system)".

The plurality of lightings 22 may include light sources such as light emitting diodes (LEDs). As illustrated in FIG. 1B, the plurality of lightings 22 may include light emitting diodes (LEDs) having hemispherical cross-sectional shape, for example. Alternatively, the plurality of lightings 22 may include a lens, a mirror, a prism, an optical fiber, or the like to transmit light emitted from the separately arranged light source to the plurality of lightings 22.

Particularly, the liquid surface imaging device 10 has a configuration in which the light emitted from the light source is transmitted to the lighting 22 via the mirror. Thus, the liquid surface imaging device 10 can prevent the liquid dropped from the head 200 from attaching the irradiator 20 and the imaging device 30.

The imaging device 30 includes an imaging element 32 and a lens 33. The imaging element 32 is arranged inside a housing 31 and images the liquid surface 301. The lens 33 is arranged on a front surface (upper surface in FIG. 1B) of the housing 31 to collect lights reflected from the liquid surface 301 (see FIG. 2).

Figure 3A:
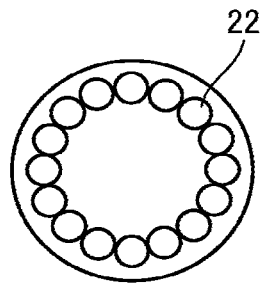
FIGS. 3A to 3C are schematic plan views of imaging results imaged by the liquid surface imaging device to illustrate an imaging operation of the liquid surface imaging device according to the first embodiment of the present disclosure.
Figure 3B:
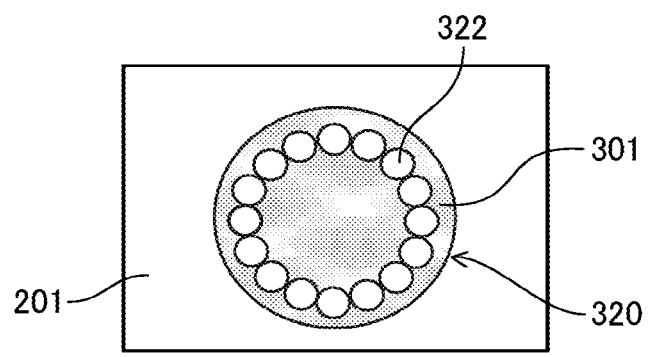
Figure 3C:
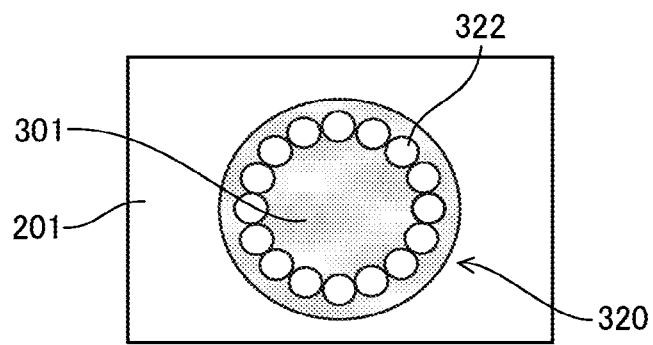

Next, an operation of the liquid surface imaging device 10 is described with reference to FIGS. 3A to 3C. FIGS. 3A to 3C are schematic plan views of imaging results imaged by the liquid surface imaging device 10 to illustrate the operation of the liquid surface imaging device 10 according to the first embodiment. In the imaging results illustrated in FIGS. 3B and 3C, the same reference numerals with reference numerals in the imaging object (target) are used for the nozzle plate 201 and the liquid surface 301.

The liquid surface imaging device 10 faces the liquid surface 301 in the nozzle 202 as illustrated in FIG. 2 to image the liquid surface 301 in the nozzle 202. However, the liquid surface imaging device 10 is not necessarily to face the liquid surface 301 to image the liquid surface 301.

The liquid surface imaging device 10 turns on the plurality of lightings 22 of the irradiator 20 to irradiate (illuminates) the liquid surface 301 with light "a" (see FIG. 2) emitted from the plurality of lightings 22. A reflected light "b" (see FIG. 2) enters the imaging element 32 via the lens 33 of the imaging device 30 (see FIG. 1B). A number, shape, and presence or absence of the lens 33 may be selected as appropriate.

Thus, as illustrated in FIG. 3B, the liquid surface imaging device 10 turns on the plurality of lightings 22 arranged annularly as illustrated in FIG. 3A to obtain an image 320 including an optical image 322 corresponding to the plurality of lightings 22 on the liquid surface 301.

Figure 5A:
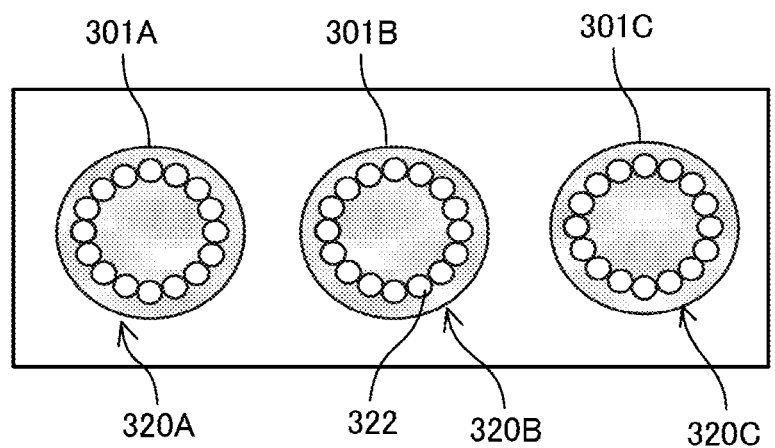
FIGS. 5A and 5B are schematic plan views of different imaging results of the liquid surface imaging device of FIG. 4.
Figure 5B:
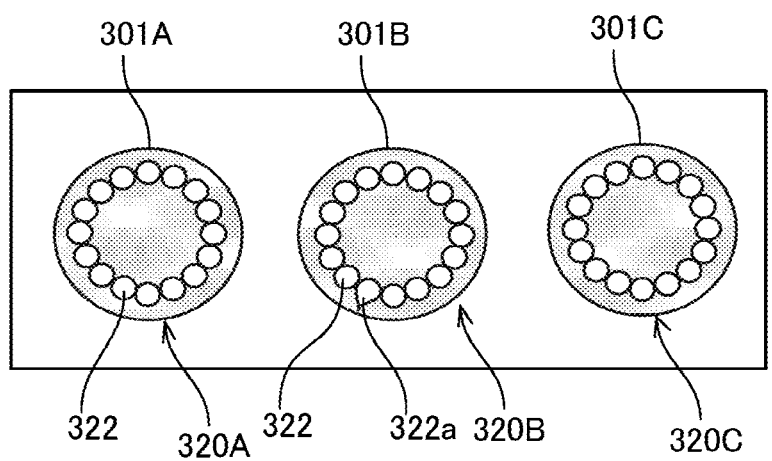

A shape and a size of the optical image 322 in the image 320 change according to a shape and a curvature of the liquid surface 301, a state of the liquid surface 301 such as a solidification of the liquid 300 around a periphery of the nozzle 202. For example, when the liquid surface 301 is distorted due to the liquid adhering to the periphery of the nozzle 202, a distortion (deformation) 322a occurs in a part of the optical image 322 so that the optical image 322 becomes not a perfect circle as illustrated in FIG. 5B.

Thus, the liquid surface imaging device 10 according to the first embodiment can obtain the image 320 by the imaging device 30 to observe and grasp the state of the liquid surface 301.

Figure 4:
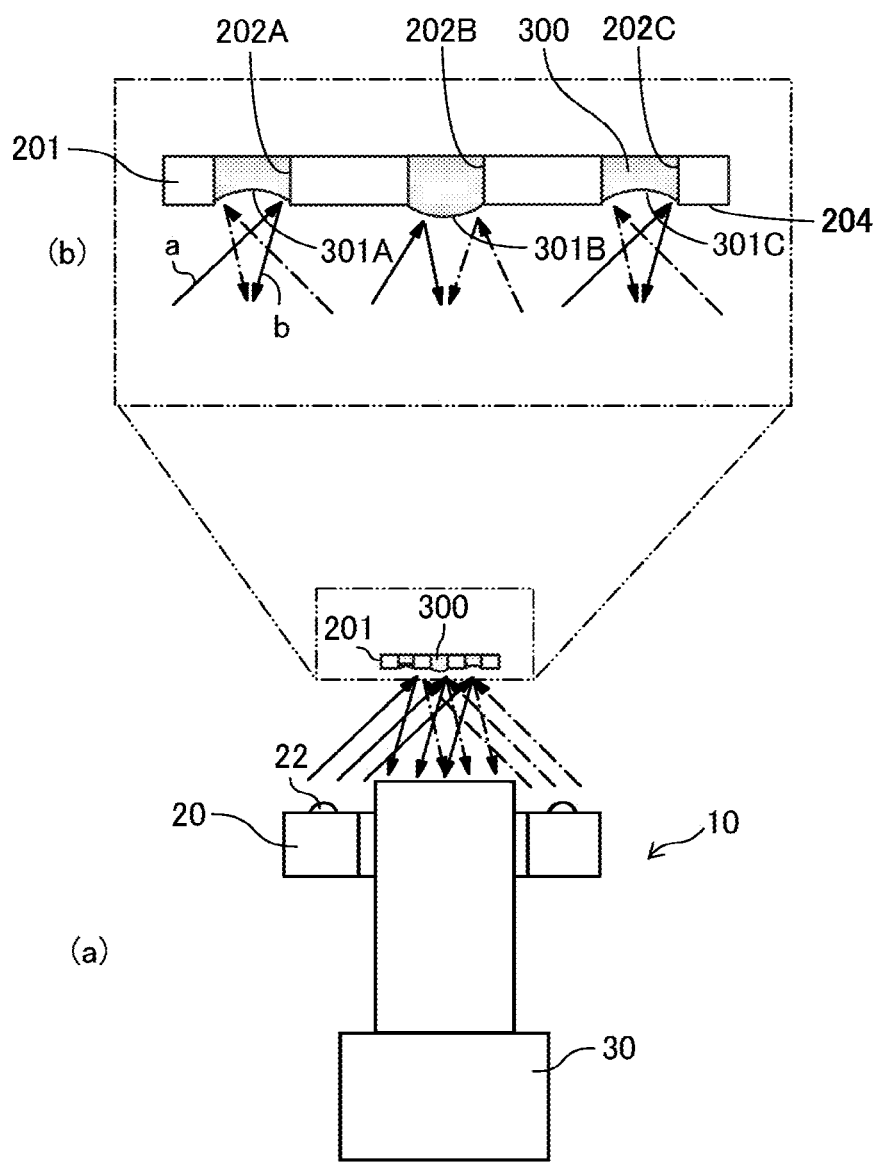
FIG. 4 is a cross-sectional front view of the liquid discharge head and the liquid surface imaging device to illustrate an imaging operation of the liquid surface imaging device when a nozzle plate of the liquid discharge head includes a plurality of nozzles.

Next, an imaging operation for the head 200 including the nozzle plate 201 that includes a plurality of nozzles 202 is described with reference to FIGS. 4, and 5A and 5B. FIG. 4 is a schematic cross-sectional front view of the head 200 and the liquid surface imaging device 10 illustrating the imaging operation. FIGS. 5A and 5B are schematic plan views of different imaging results of FIG. 4.

As illustrated in FIG. 4(a), the plurality of lightings 22 of the irradiator 20 of the liquid surface imaging device 10 emits the lights "a" so that the liquid surfaces 301A to 301C in the nozzles 202A to 202C, respectively, are irradiated with the lights "a" as illustrated in FIG. 4(b). The reflected lights "b" reflected from each of the liquid surfaces 301A to 301C enter the imaging element 32 of the imaging device 30 (see FIG. 1B).

If the liquid surfaces 301A to 301C in three nozzles 202A to 202C are all in good condition, such as the liquid surfaces 301A to 301C having a concave shape as illustrated in FIG. 4(a), the images 320A to 320C having undistorted (undeformed) optical images 322 corresponding to the plurality of lightings 22 can be obtained as illustrated in FIG. 5A.

Conversely, if the liquid surface 301B of the nozzle 202B in the middle of the nozzles 202A to 202C is distorted (see liquid surface 301B having a convex shape in FIG. 4(b)), the image 320B having a distortion (deformation) 322a in a part of the optical image 322 corresponding to a part of the plurality of lightings 22 is obtained on the liquid surface 301B in the nozzle 202B as illustrated in FIG. 5B.

Thus, the liquid surface imaging device 10 according to the first embodiment is used to enable imaging and observation of the state of the liquid surface 301 in the plurality of nozzles 202 at one time.

Figure 6:
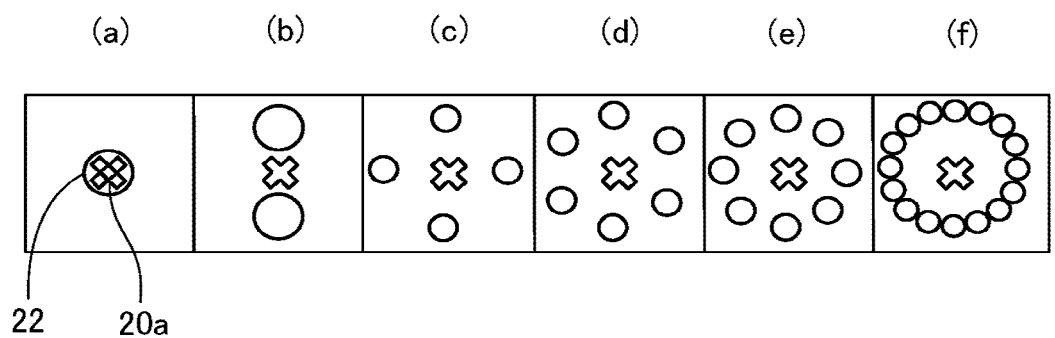
FIG. 6 is a schematic plan view of the liquid surface imaging device according to a second embodiment of the present disclosure.

Next, a different example of the liquid surface imaging device 10 in a second embodiment of the present disclosure is described with reference to FIG. 6. FIG. 6 is a schematic plan view of different examples of the irradiator 20 of the liquid surface imaging device 10 according to the second embodiment of the present disclosure.

A first example illustrated in FIG. 6(a) is an example including one lighting 22. Since the center 20a of the irradiator 20 is arranged at a center of the one lighting 22 22, the one lighting 22 is point-symmetrically arranged.

In a second example of FIG. 6(b), two lightings 22 are arranged in a point-symmetrical position with a positional relationship of 180° with the center 20a of the irradiator 20 interposed between the two lightings 22.

In a third to the fifth examples illustrated in FIGS. 6(c) to 6(e), an even number of four or more lightings 22 are arranged in a polygonal shape. The four or more lightings 22 having polygonal shape are arranged point-symmetrically with the center 20a of the imaging unit 20 as the point (center) of symmetry. Four lightings 22 are arranged in a tetragon in the third example in FIG. 6(c). Six lightings 22 are arranged in a hexagon in the fourth example in FIG. 6(d). Eight lightings 22 are arranged in an octagon in the fifth example in FIG. 6(e).

In the sixth example in FIG. 6(f), sixteen lightings 22 are arranged point-symmetrically with the center 20a of the imaging unit 20 as the point (center) of symmetry. The sixteen lightings 22 are arranged annularly in a ring shape as in the first embodiment.

Figure 7:
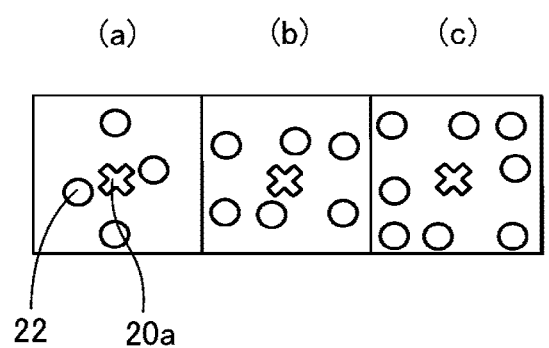
FIG. 7 is a schematic plan view of different examples of an irradiator of the liquid surface imaging device according to a third embodiment of the present disclosure.

Next, a different example of the liquid surface imaging device 10 in a third embodiment of the present disclosure is described with reference to FIG. 7. FIG. 7 is a schematic plan view of different examples of the liquid surface imaging device 10 according to the third embodiment of the present disclosure.

In a first to third examples in FIG. 7(a) to FIG. 7(c), respectively, two of each of the plurality of lightings 22 are arranged in a point-symmetrical position with a positional relationship of 180° with the center 20a of the irradiator 20 interposed between the two of each of the plurality of lightings 22. Four lightings 22 are arranged point-symmetrically with the center 20a of the irradiator 20 in the first example in FIG. 7(a). Six lightings 22 are arranged point-symmetrically with the center 20a of the irradiator 20 in the second example in FIG. 7(b). Eight lightings 22 are arranged point-symmetrically with the center 20a of the irradiator 20 in the third example in FIG. 7(c).

Figure 8A:
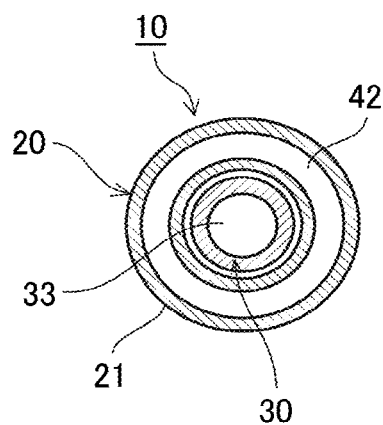
FIGS. 8A and 8B are schematic plan view and a cross-sectional front view, respectively, of a liquid surface imaging device according to a fourth embodiment of the present disclosure.
Figure 8B:
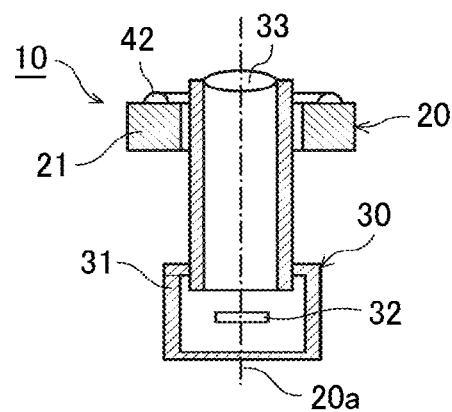
Figure 9:
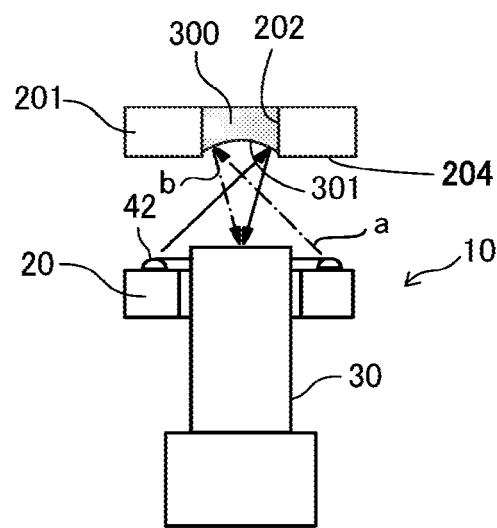
FIG. 9 is a schematic cross-sectional front view of the liquid surface imaging device when the liquid surface imaging device images a liquid surface in a nozzle of a liquid discharge head.

A fourth embodiment of the present disclosure is described with reference to FIGS. 8A and 8B, and FIG. 9. FIG. 8A is a schematic plan view of the liquid surface imaging device 10 according to the fourth embodiment of the present disclosure. FIG. 8B is a schematic cross-sectional front view of the liquid surface imaging device 10 of FIG. 8A. FIG. 9 is a schematic cross-sectional front view of the liquid surface imaging device 10 when the liquid surface imaging device 10 images a liquid surface 301 in the nozzle 202 of the head 200.

The liquid surface imaging device 10 includes the irradiator 20 and the imaging device 30. The irradiator 20 includes one ring-shaped lighting 42 to irradiate the liquid surface 301 (meniscus surface) of the liquid 300 held in the nozzle 202 of the head 200 with light emitted from the ring-shaped lighting 42. The nozzle 202 is formed in the nozzle plate 201 (see FIG. 9) of the head 200 (see FIG. 25). The imaging device 30 images the liquid surface 301 of the liquid 300 in the nozzle 202 of the head 200.

The irradiator 20 includes one ring-shaped (belt-shaped) lighting 42 on the holder 21. The ring-shaped lighting 42 has an annular shape. The ring-shaped lighting 42 is arranged point-symmetrically with the center 20a (optical axis) as a point (center) of symmetry when the irradiator 20 is viewed in an irradiation direction (viewed in a vertical direction from above in FIG. 8B). The center 20a is a center of the imaging device 30 in the fourth embodiment of the present disclosure. If the imaging device 30 includes a lens 33, the center 20a and the optical axis can also be referred to as "a symmetry axis passing through a center of the lens 33 (optical imaging system)".

The ring-shaped lighting 42 is turned on to emit light. The ring-shaped lighting 42 may be configured by a tube-like light source, for example. Alternatively, the liquid surface imaging device 10 may include a lens, a mirror, a prism, an optical fiber, or the like to transmit a light emitted from a separately arranged light source to the ring-shaped lighting 42.

The imaging device 30 includes an imaging element 32 and a lens 33. The imaging element 32 is arranged inside the housing 31 and images the liquid surface 301. The lens 33 is arranged on a front surface (upper surface in FIG. 8B) of the housing 31 to collect lights reflected from the liquid surface 301 (see FIG. 9).

Since the light emitted from the ring-shaped annular lighting 42 is smoothly reflected on a meniscus (liquid surface 301), it is easy to determine a meniscus shape (concave shape or convex shape) of the liquid surface 301 from the image 320 imaged by the liquid surface imaging device 10.

Figure 10A:
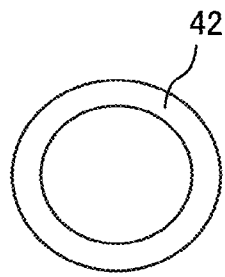
FIGS. 10A to 10C are schematic plan views of imaging results imaged by the liquid surface imaging device to illustrate an imaging operation of the liquid surface imaging device according to the fourth embodiment of the present disclosure.
Figure 10B:
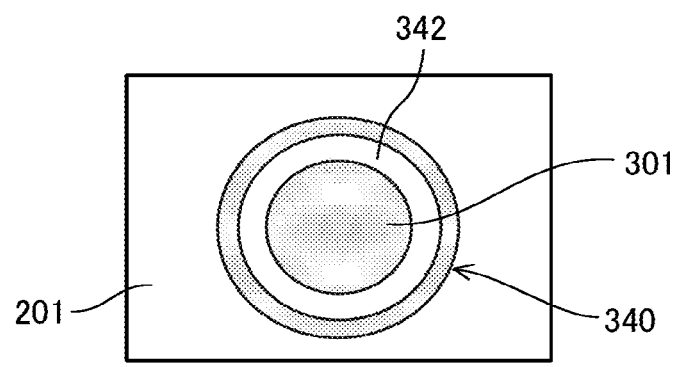
Figure 10C:
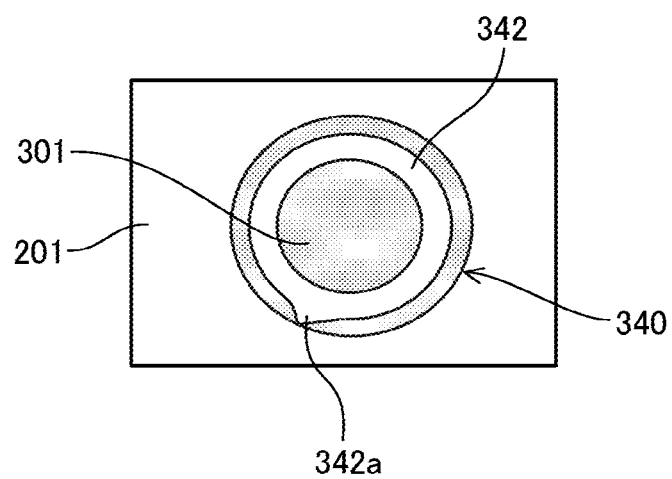

Next, an operation of the liquid surface imaging device 10 is described with reference to FIGS. 10A to 10C. FIGS. 10A to 10C are schematic plan views of imaging results imaged by the liquid surface imaging device 10 to illustrate the operation of the liquid surface imaging device 10 according to the fourth embodiment.

The liquid surface imaging device 10 faces the liquid surface 301 in the nozzle 202 as illustrated in FIG. 9 to image the liquid surface 301 in the nozzle 202. However, the liquid surface imaging device 10 is not necessarily to face the liquid surface 301 to image the liquid surface 301 in the nozzle 202.

The liquid surface imaging device 10 turns on the ring-shaped lighting 42 of the irradiator 20 to irradiate (illuminates) the liquid surface 301 with a light "a" (see FIG. 9) emitted from the ring-shaped lighting 42. The reflected light "b" (see FIG. 9) enters the imaging element 32 via the lens 33 of the imaging device 30 (see FIG. 8B).

Thus, the liquid surface imaging device 10 turns on the ring-shaped lighting 42 as illustrated in FIG. 10A to obtain an image 340 including an optical image 342 corresponding to the ring-shaped lighting 42 on the liquid surface 301 as illustrated in FIG. 10B.

A shape and a size of the optical image 342 in the image 340 change according to a shape and a curvature of the liquid surface 301, and a state of the liquid surface 301 such as a solidification of the liquid 300 around a periphery of the nozzle 202. For example, when the liquid surface 301 is distorted due to the liquid adhering to the periphery of the nozzle 202, the optical image 342 in the image 340 may include a distortion 342a in a part of the optical image 342 as illustrated in FIG. 10C.

Thus, the liquid surface imaging device 10 according to the fourth embodiment can obtain the image 340 by the imaging device 30 to observe and grasp the state of the liquid surface 301.

Figure 11:
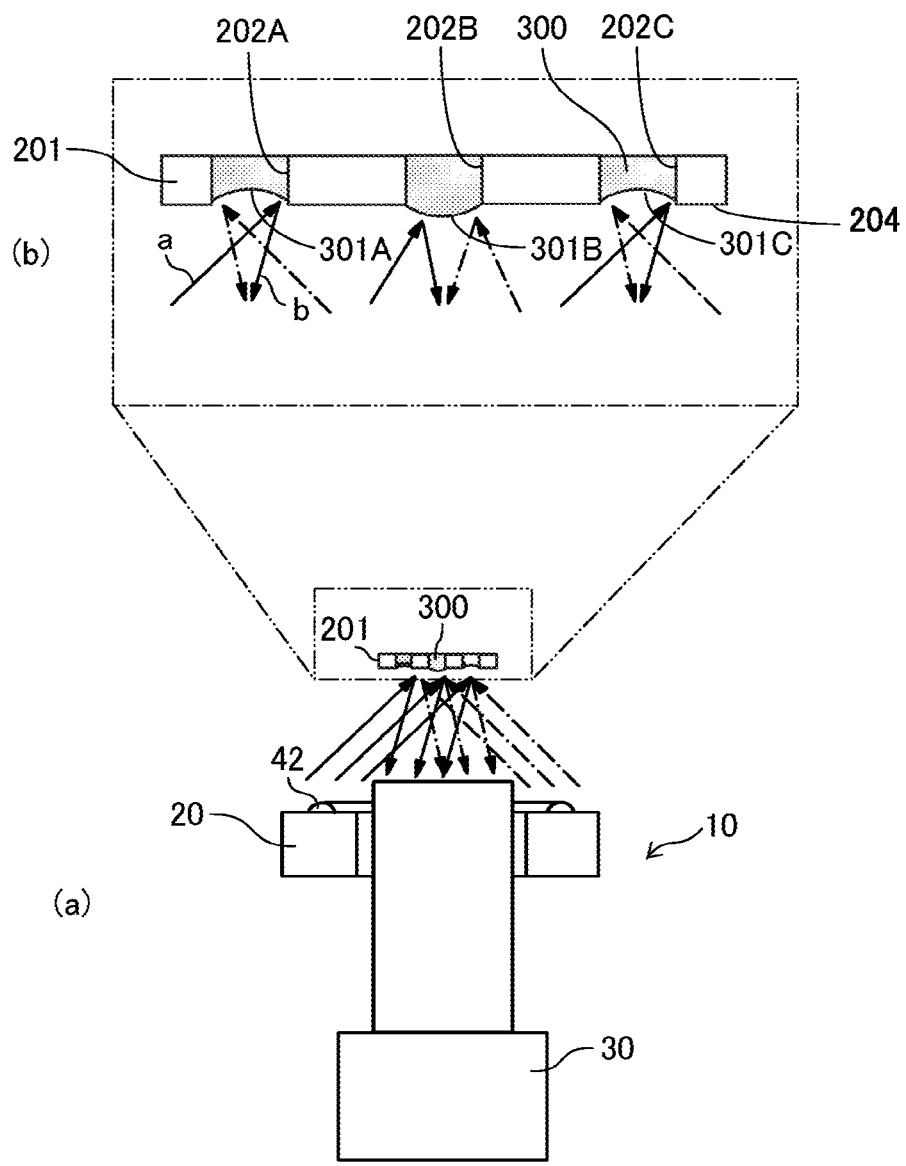
FIG. 11 is a cross-sectional front view of the liquid discharge head and the liquid surface imaging device to illustrate an imaging operation of the liquid surface imaging device when the nozzle plate of the liquid discharge head includes the plurality of nozzles.
Figure 12A:
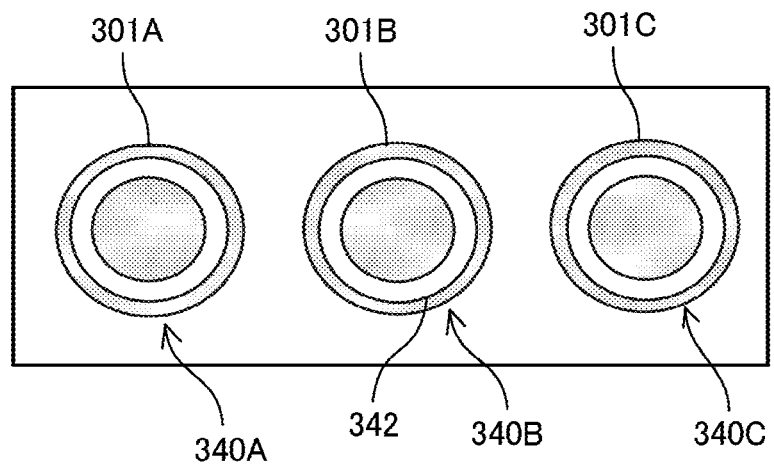
FIGS. 12A and 12B are schematic plan views of an example of the imaging results imaged by the liquid surface imaging device to illustrate the imaging operation of the liquid surface imaging device of FIG. 11.
Figure 12B:
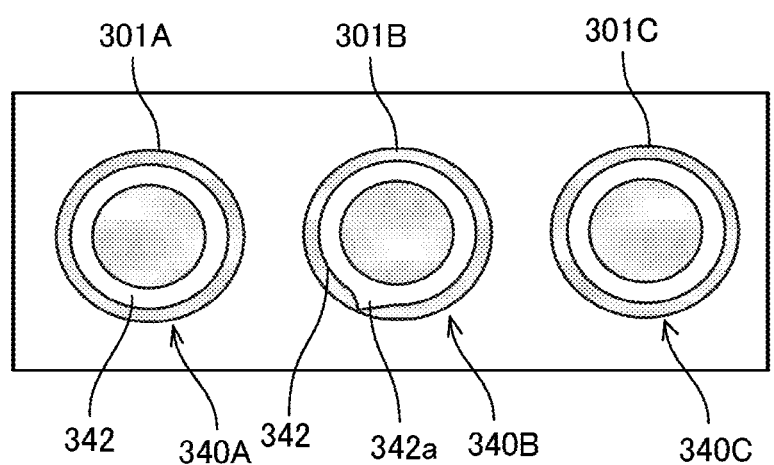

Next, an imaging operation for the head 200 including the nozzle plate 201 that includes a plurality of nozzles 202 is described with reference to FIG. 11 and FIGS. 12A and 12B. FIG. 11 is a schematic cross-sectional front view of the head 200 and the liquid surface imaging device 10 illustrating the imaging operation. FIGS. 12A and 12B are schematic plan views of different imaging results of FIG. 11.

As illustrated in FIG. 11(a), the plurality of lightings 42 of the irradiator 20 of the liquid surface imaging device 10 emits the lights "a" so that the liquid surfaces 301A to 301C in the nozzles 202A to 202C, respectively, are irradiated with the lights "a" as illustrated in FIG. 11(b). FIG. 11 illustrates the head 200 including a plurality (here, three) of the nozzles 202A to 202C. The reflected lights "b" reflected from each of the liquid surfaces 301A to 301C enter the imaging element 32 of the imaging device 30 (see FIG. 8B).

If the liquid surfaces 301A to 301C in three nozzles 202A to 202C are all in good condition, such as the liquid surfaces 301A to 301C having a concave shape as illustrated in FIG. 11(b), the images 340A to 340C having undistorted (undeformed) optical images 342 corresponding to the ring-shaped lighting 42 can be obtained as illustrated in FIG. 12A.

Conversely, if the liquid surface 301B of the nozzle 202B in the middle of the nozzles 202A to 202C is distorted (see liquid surface 301B having a convex shape in FIG. 11(b)), the image 340B having a distortion (deformation) 342a in a part of the optical image 342 corresponding to the ring-shaped lighting 42 is obtained on the liquid surface 301B in the nozzle 202B as illustrated in FIG. 12B.

Thus, the liquid surface imaging device 10 according to the fourth embodiment can image the state of the liquid surfaces 301 in the plurality of nozzles 202 at one time to observe the state of the liquid surfaces 301.

Next, a different example of the liquid surface imaging device 10 in a fifth embodiment of the present disclosure is described with reference to FIG. 13. FIGS. 13A to 13D are schematic plan views of different examples of the irradiator 20 of the liquid surface imaging device 10 according to the fifth embodiment of the present disclosure.

Figure 13A:
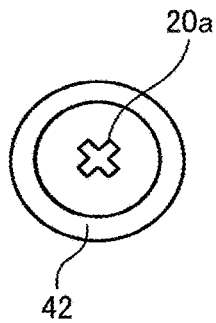
FIGS. 13A to 13D are schematic plan views of different examples of the irradiator of the liquid surface imaging device according to a fifth embodiment of the present disclosure.

A first example in FIG. 13A includes one annular ring-shaped (belt-shaped) lighting 42 as in the fourth embodiment. The one annular ring-shaped (belt-shaped) lighting 42 is arranged point-symmetrically with the center 20a of the irradiator 20 (imaging device 30) as the point (center) of symmetry.

Figure 13B:
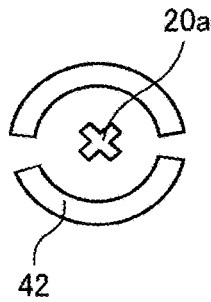
Figure 13C:
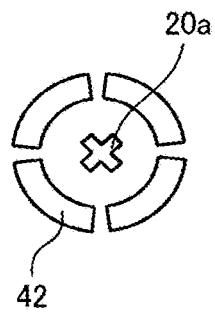
Figure 13D:
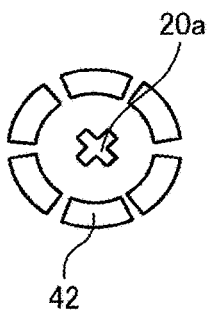

In a second example to a fourth example illustrated in FIGS. 13B to 13D, an even number of belt-shaped lightings 42 are arranged annularly around the center 20a of the irradiator 20 (imaging device 30). Two belt-shaped lightings 42 are arranged point-symmetrically with the center 20a of the irradiator 20 in the second example illustrated in FIG. 13B. Four belt-shaped lightings 42 are arranged point-symmetrically with the center 20a of the irradiator 20 in the third example illustrated in FIG. 13C. Six belt-shaped lightings 42 are arranged point-symmetrically with the center 20a of the irradiator 20 in the fourth example illustrated in FIG. 13D.

Next, a different example of the liquid surface imaging device 10 in a sixth embodiment of the present disclosure is described with reference to FIG. 14. FIGS. 14A to 14D are schematic plan views of different examples of the irradiator 20 of the liquid surface imaging device 10 according to the sixth embodiment of the present disclosure.

Figure 14A:
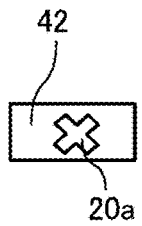
FIGS. 14A to 14D are schematic plan views of different examples of the irradiator of the liquid surface imaging device according to a sixth embodiment of the present disclosure.

A first example in FIG. 14A is an example including one belt-shaped lighting 42 having a rectangular shape. Since the center 20a of the irradiator 20 is arranged at a center of the one belt-shaped lighting 42, the one belt-shaped lighting 22 is point-symmetrically arranged with the center 20a of the irradiator 20 as the point of symmetry.

Figure 14B:
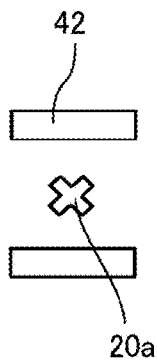
Figure 14C:
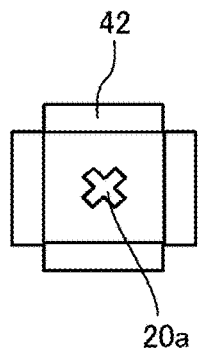
Figure 14D:
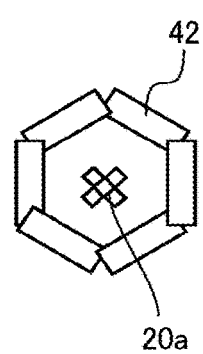

In a second example to a fourth example respectively illustrated in FIGS. 14B to 14D, the plurality of belt-shaped lightings 42 are arranged in point symmetry with the center 20a of the irradiator 20 as the point of symmetry. Two belt-shaped lightings 42 are arranged in the second example in FIG. 14B. Four lightings 22 are arranged in a tetragon in the third example in FIG. 14C. Six lightings 42 are arranged in a hexagon in the fourth example in FIG. 14D.

Figure 15A:
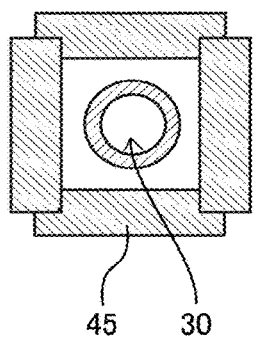
FIGS. 15A to 15C are schematic plan views of the liquid surface imaging device according to a seventh embodiment of the present disclosure.
Figure 15B:
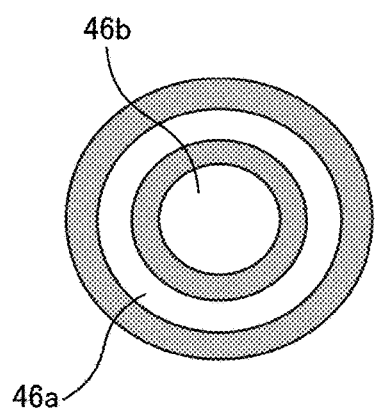
Figure 15C:
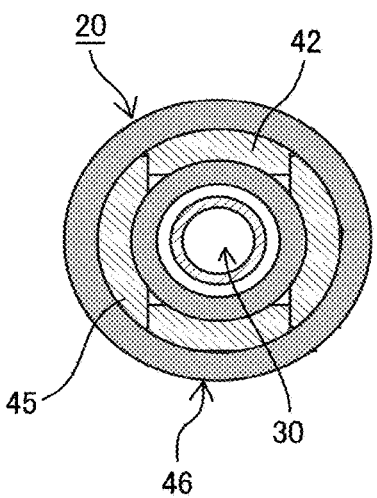

Next, a seventh embodiment of the present disclosure is described with reference to FIGS. 15A to 15C. FIGS. 15A to 15C are schematic plan views of the liquid surface imaging device 10 according to the seventh embodiment of the present disclosure.

In the seventh embodiment, the irradiator 20 includes four light sources 45 (light emitters) arranged in a rectangular shape as illustrated in FIG. 15A. As illustrated in FIGS. 15B and 15C, the irradiator 20 includes a mask 46 including mask portions 46a and 46b to mask a portion other than a portion of the lighting 42.

Therefore, as illustrated in FIG. 15C, the mask 46 is overlapped on the light sources 45 to form one annular belt-shaped lighting 42.

The irradiator 20 in the seventh embodiment does not have to have a symmetrical shape or annular shape. Thus, it is improved a degree of freedom in selection of the shape of the irradiator 20. Further, there are advantages in a layout of arrangement of the irradiator 20 and a cost of the irradiator 20.

Figure 16A:
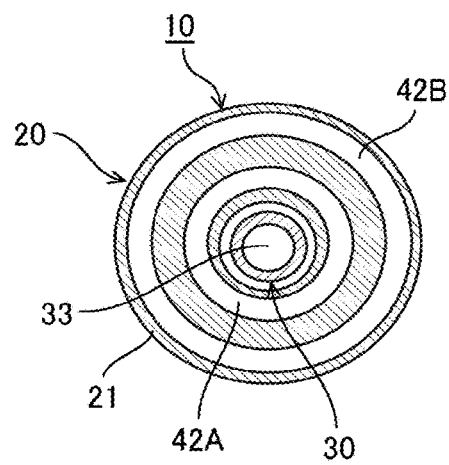
FIGS. 16A and 16B are schematic plan view and cross-sectional front view, respectively, of the liquid surface imaging device according to an eighth embodiment of the present disclosure.
Figure 16B:
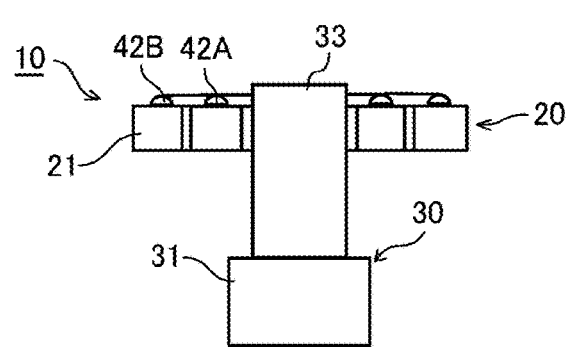
Figure 17A:
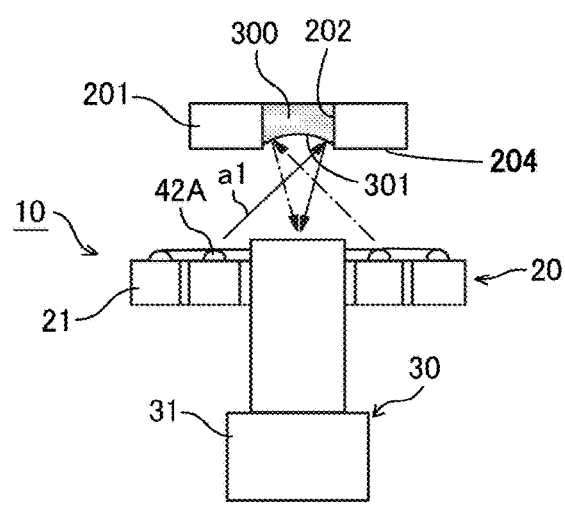
FIGS. 17A and 17B are schematic cross-sectional front views of the liquid surface imaging device when the liquid surface imaging device of FIGS. 16A and 16B images the liquid surface in the nozzle of the liquid discharge head.
Figure 17B:
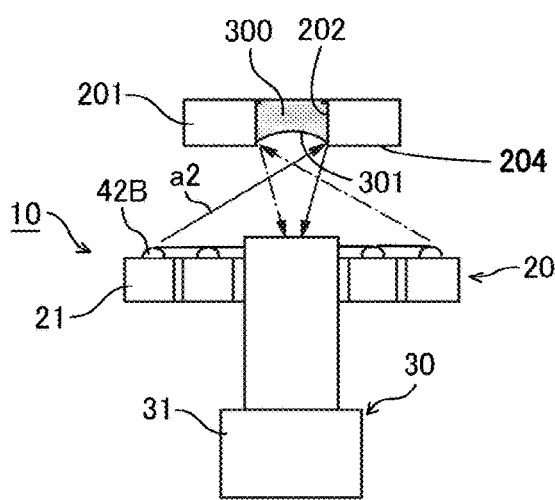
Figure 18:
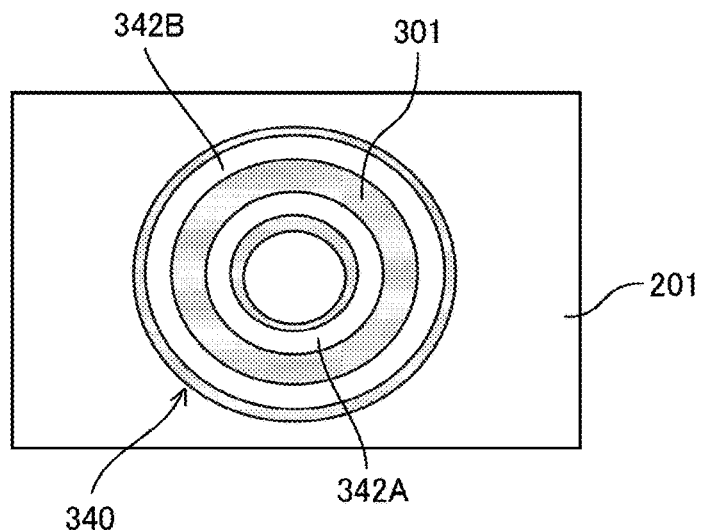
FIG. 18 is a schematic plan view of the imaging result imaged by the liquid surface imaging device to illustrate the operation of the liquid surface imaging device of FIGS. 16A and 16B.

Next, an eighth embodiment of the present disclosure is described with reference to FIGS. 16A and 16B, FIGS. 17A and 17B, and FIG. 18. FIG. 16A is a schematic plan view of the liquid surface imaging device 10 according to the eighth embodiment of the present disclosure. FIG. 16B is a schematic cross-sectional front view of the liquid surface imaging device 10 of FIG. 16A. FIGS. 17A and 17B are schematic cross-sectional front views of the liquid surface imaging device 10 when the liquid surface imaging device 10 images a liquid surface 301 in the nozzle 202 of the head 200. FIG. 18 is a schematic plan view of an imaging result imaged by the liquid surface imaging device 10 to illustrate the operation of the liquid surface imaging device 10 of FIGS. 16A and 16B, and FIGS. 17A and 17B.

The irradiator 20 according to the eighth embodiment includes the (annular) ring-shaped lightings 42A and 42B arranged concentrically. Thus, the irradiator 20 includes two or more ring-shaped lightings 42A and 42B arranged concentrically in a radial direction from the center 20a as a starting point. The two or more ring-shaped lightings 42A and 42B arranged point-symmetrically with the center 20a of the irradiator 20 as the point (center) of symmetry.

The liquid surface imaging device 10 thus configured emits light "a1" from the ring-shaped lighting 42A arranged inside the ring-shaped lighting 42B (see FIGS. 16A and 16B) to the liquid surface 301 in the nozzle 202 of the head 200. Reflected light "b1" of the light "a1" reflected from the liquid surface 301 enters the imaging device 30 as illustrated in FIG. 17A. Further, the liquid surface imaging device 10 emits light "a2" from the ring-shaped lighting 42B arranged outside the ring-shaped lighting 42A to the liquid surface 301 in the nozzle 202 of the head 200. Reflected light of the light "a2" reflected from the liquid surface 301 enters the imaging device 30 as illustrated in FIG. 17B.

Thus, as illustrated in FIG. 18, the liquid surface imaging device 10 can obtain an image 340 including an optical image 342A corresponding to the ring-shaped lighting 42A and an optical image 342B corresponding to the ring-shaped lighting 42B on the liquid surface 301. The images 340 correspond to the ring-shaped lightings 42A and 42B when the liquid surface 301 has a concave shape.

The liquid surface imaging device 10 thus configured can obtain information of the liquid surface 301 at two places of the ring-shaped lightings 42A and 42B in the radial direction of the nozzle 202. For example, the liquid surface imaging device 10 can obtain a curvature of the liquid surface 301 from a positional relationship between the two places of the ring-shaped lightings 42A and 42B.

Figure 19A:
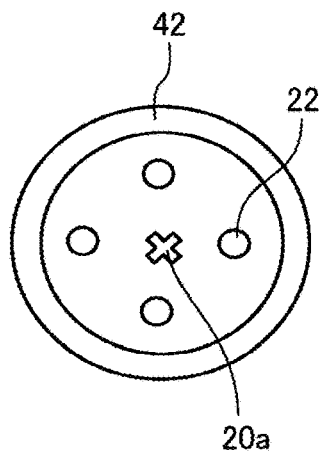
FIGS. 19A and 19B are schematic plan views of different examples of the irradiator of the liquid surface imaging device according to a ninth embodiment of the present disclosure.
Figure 19B:
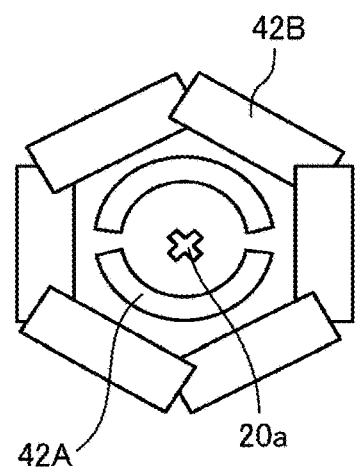

Next, a different example of the liquid surface imaging device 10 in a ninth embodiment of the present disclosure is described with reference to FIGS. 19A and 19B. FIGS. 19A to 19B are schematic plan views of the liquid surface imaging device 10 according to the ninth embodiment of the present disclosure.

Similar to the eighth embodiment as illustrated in FIGS. 16A and 16B, the irradiator 20 according to the ninth embodiment includes at least one lighting (42 in FIGS. 19A and 42B in FIG. 19B). The at least one lighting 42 and 42B and the plurality of lightings (22 in FIGS. 19A and 42A in FIG. 19B) are arranged concentrically in a radial direction with the center 20a of the irradiator 20 (imaging device 30) as the point of symmetry. In FIG. 19B, two or more lightings 42B arranged concentrically in the radial direction from the center 20a as a starting point. Further, the two or more lightings 42B are arranged point-symmetrically with the center 20a of the irradiator 20 as the point of symmetry.

In a first example illustrated in FIG. 19A, the liquid surface imaging device 10 includes a plurality of (four in FIG. 19A) lightings 22 (inner lightings) arranged in a tetragonal shape. Further, a ring-shaped lighting 42 (outer lighting) is arranged outside the plurality of lightings 22 to surround the plurality of lightings 22.

In a second example illustrated in FIG. 19B, a plurality of (two in FIG. 19B) belt-shaped lightings 42A (inner lightings) are arranged annularly and point-symmetrically with the center 20a of the irradiator 20 as the point of symmetry. Further, a plurality of (six in FIG. 19B) belt-shaped lightings 42B (outer lightings) are arranged outside the plurality of belt-shaped lightings 42A (inner lightings) to surround the plurality of belt-shaped lightings 42A. The plurality of belt-shaped lightings 42B (outer lightings) are arranged in a polygonal shape (hexagonal shape in FIG. 19B).

Figure 20:
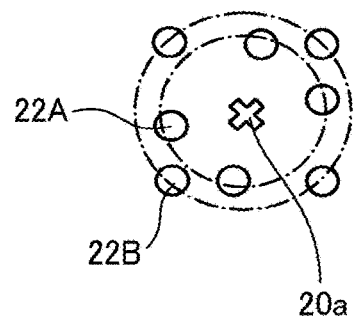
FIG. 20 is a schematic plan view of a different example of the irradiator of the liquid surface imaging device according to a tenth embodiment of the present disclosure.

Next, a different example of the liquid surface imaging device 10 in a tenth embodiment of the present disclosure is described with reference to FIG. 20. FIG. 20 is a schematic plan view of the irradiator 20 of the liquid surface imaging device 10 according to the tenth embodiment of the present disclosure.

Similar to the eighth embodiment as illustrated in FIGS. 16A and 16B, the irradiator 20 according to the tenth embodiment includes two or more lightings arranged concentrically in the radial direction from the center 20a as a starting point. Further, the two or more lightings are arranged point-symmetrically with the center 20a of the irradiator 20 as the point of symmetry. A plurality of (four in FIG. 20) lightings 22A (inner lightings) are arranged annularly and point-symmetrically with the center 20a of the irradiator 20 as the point of symmetry. Further, a plurality of (four in FIG. 20) lightings 22B (outer lightings) are arranged annularly to surround the plurality of lightings 22A (inner lightings). The plurality of lightings 22B (outer lightings) are arranged point-symmetrically with the center 20a of the irradiator as the point of symmetry.

Figure 21:
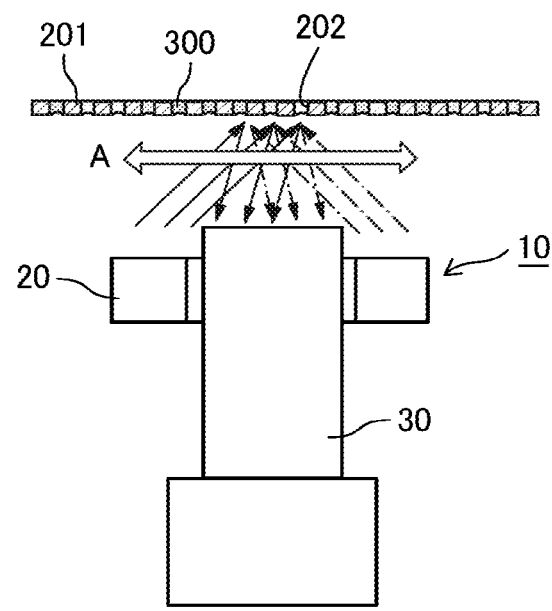
FIG. 21 is a schematic cross-sectional front view of the liquid surface imaging device according to an eleventh embodiment of the present disclosure.

An eleventh embodiment according to the present disclosure is described with reference to FIG. 21. FIG. 21 is a schematic front view of the liquid surface imaging device 10 according to the eleventh embodiment.

The liquid surface imaging device 10 according to the eleventh embodiment moves relative to the nozzle plate 201 in a nozzle array direction as indicated by arrow "A" in FIG. 21. The nozzle plate 201 includes a plurality of the nozzles 202 arrayed in the nozzle array direction.

Thus, the liquid surface imaging device 10 according the eleventh embodiment can observe the liquid surfaces 301 of a larger number of the nozzles 202.

Figure 22:
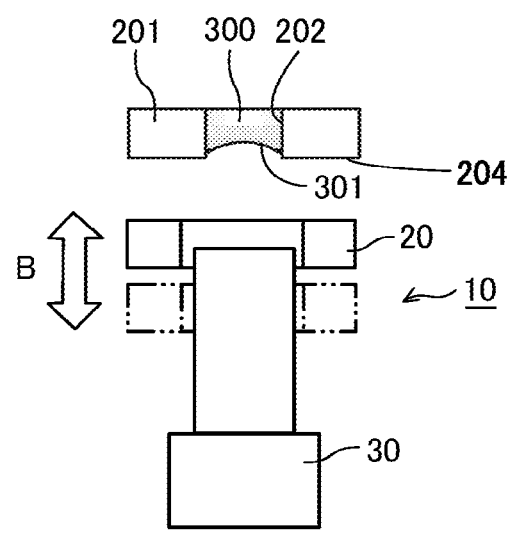
FIG. 22 is a schematic cross-sectional front view of the liquid surface imaging device according to a twelfth embodiment of the present disclosure.
Figure 23:
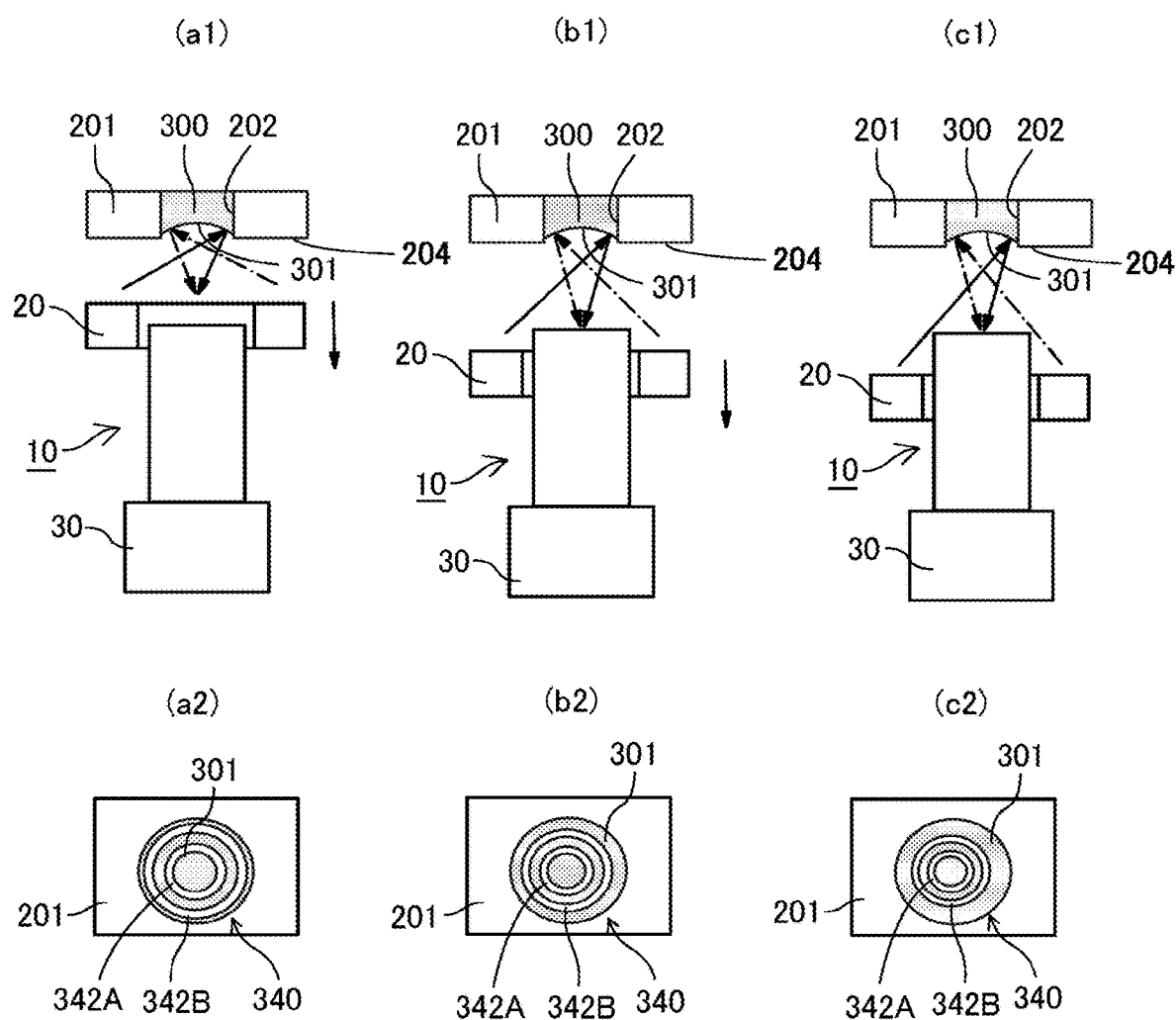
FIG. 23 is a schematic cross-sectional front view of the liquid surface imaging device to illustrate the imaging operation of the liquid surface imaging device of FIG. 22.

A twelfth embodiment of the present embodiment is described with reference to FIGS. 22 and 23. FIG. 22 is a schematic front view of the liquid surface imaging device 10 according to the twelfth embodiment. FIGS. 23(a1) to 23(c1) are schematic front views of the liquid surface imaging device 10 according to the twelfth embodiment illustrating an imaging operation. FIGS. 23(a2) to 23(c2) are schematic plan views of the liquid surface imaging device 10 according to the twelfth embodiment illustrating images 340 on the liquid surfaces 301.

The liquid surface imaging device 10 according to the twelfth embodiment includes the irradiator 20 that is movable toward or away from the nozzle plate 201 (liquid surface 301) as an imaging target in a direction (vertical direction) indicated by arrow "B" in FIG. 22. The irradiator 20 (plurality of lightings 22) is arranged around a periphery of the imaging device 30.

The liquid surface imaging device 10 thus configured can obtain the image 340 having the largest optical image 342 as illustrated in FIG. 23(a2) among the optical images 342 illustrated in FIGS. 23(a2) to 23(c2) when the irradiator 20 is at the closest position to the liquid surface 301 as illustrated in FIG. 23(a1), for example.

The liquid surface imaging device 10 can obtain the image 340 having a medium sized optical image 342 as illustrated in FIG. 23(b2) among the optical images 342 illustrated in FIGS. 23(a2) to 23(c2) when the irradiator 20 is disposed at a medium position illustrated in FIG. 23(b1) that is a position between a position illustrated in FIG. 23(a1) and a position illustrated in FIG. 23(c1) in the vertical direction indicated by an arrow B.

The liquid surface imaging device 10 can obtain the image 340 having the smallest optical image 342 as illustrated in FIG. 23(c2) among the optical images 342 illustrated in FIGS. 23(a2) to 23(c2) when the irradiator 20 is farthest from the liquid surface 301 as illustrated in FIG. 23(c1).

In each of the above-described embodiments, the plurality of lightings 22 of the irradiator 20 is arranged around the periphery of the imaging device 30. Thus, the liquid surface imaging device 10 in the above-described embodiments can reduce the size of the liquid surface imaging device 10. However, if the liquid surface 301 is inside an imaging region of the imaging device 30, the light reflected from the liquid surface 301 is incident on the imaging device 30. Thus, the plurality of lightings 22 of the irradiator 20 may not be arranged around the periphery of the imaging device 30.

Figure 24:
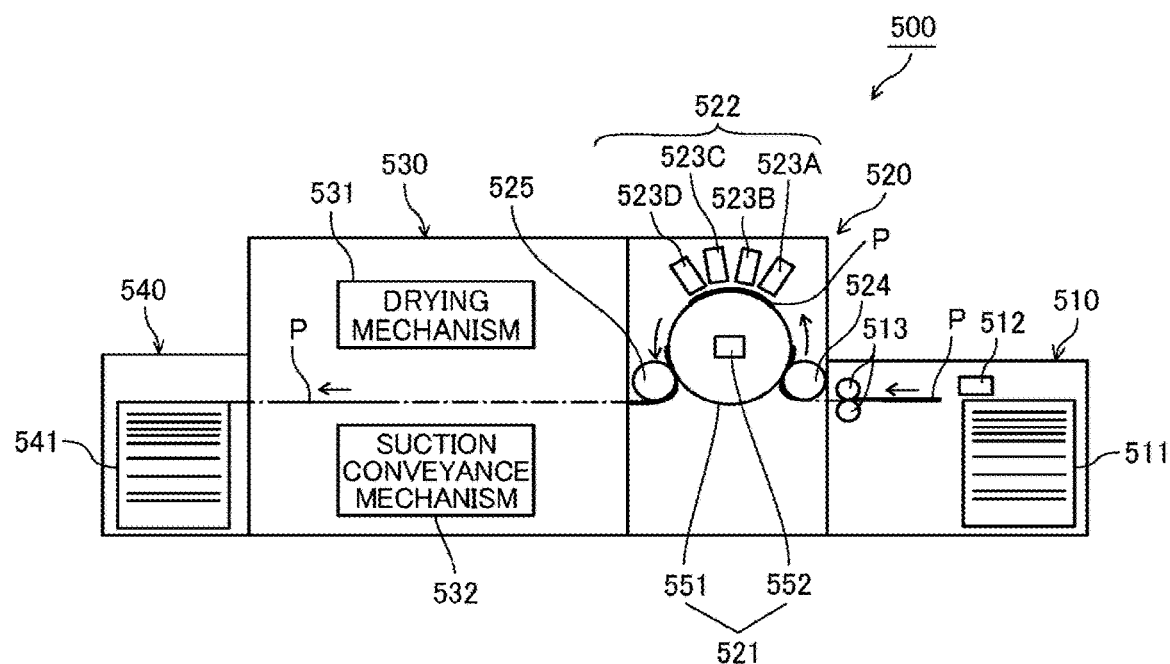
FIG. 24 is a schematic cross-sectional front view of a printer as a liquid discharge apparatus according to a thirteenth embodiment of the present disclosure.
Figure 25:
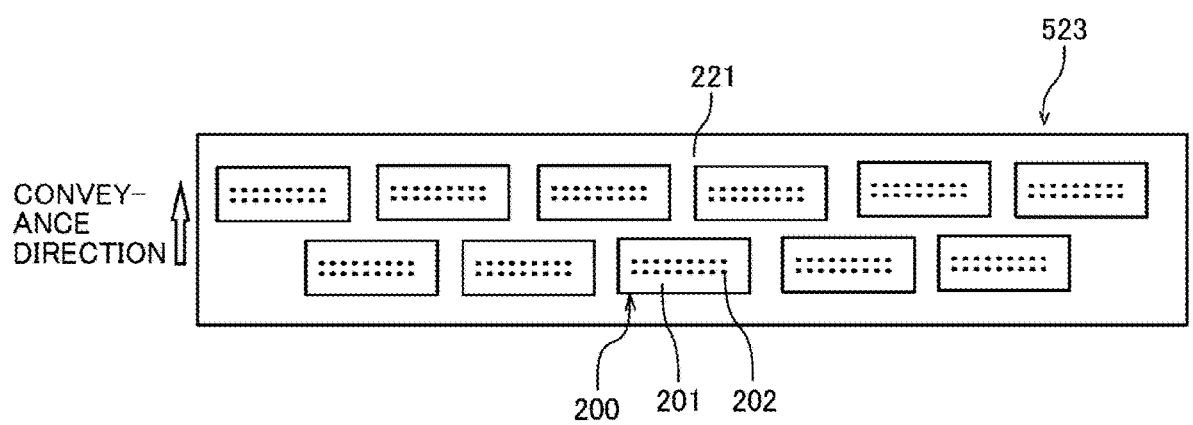
FIG. 25 is a plan view of an example of a discharge unit of the printer of FIG. 24.

A thirteenth embodiment of the present embodiment is described with reference to FIGS. 24 and 25. FIG. 24 is a schematic side view of an example of a printer 500 as a liquid discharge apparatus according to the thirteenth embodiment of the present disclosure. FIG. 25 is a plan view of an example of a discharge unit 523 of the printer 500.

The printer 500 includes a loading device 510, a printing device 520, a drying device 530, and an ejection device 540. The printer 500 applies a liquid to a sheet P conveyed from the loading device 510 by the printing device 520 to perform required printing, dries the liquid adhering to the sheet P by the drying device 530, and ejects the sheet P to the ejection device 540.

The loading device 510 includes a loading tray 511 on which a plurality of sheets P are stacked, a feeding device 512 to separate and feed the sheets P one by one from the loading tray 511, and a resist roller pair 513 to feed the sheet P to the printing device 520.

Any feeding devices such as a device using a roller or a device using air suction may be used as the feeding device 512. The sheet P delivered from the loading tray 511 by the feeding device 512 is delivered to the printing device 520 by the resist roller pair 513 being driven at a predetermined timing after a leading end of the sheet P reaches the resist roller pair 513.

The printing device 520 includes a sheet conveyor 521 to convey the sheet P. The sheet conveyor 521 includes a drum 551 and a suction device 552. The drum 551 is a bearer (rotating member) that bears the sheet P on a circumferential surface of the drum 551 and rotates. The suction device 552 generates a suction force on the circumferential surface of the drum 551.

The printing device 520 includes a liquid discharge device 522 that discharges the liquid toward the sheet P borne on the drum 551 of the sheet conveyor 521 to apply the liquid to the sheet P.

The printing device 520 further includes a transfer cylinder 524 and a delivery cylinder 525. The transfer cylinder 524 receives the sheet P fed from the resist roller pair 513 and transfers the sheet P to the drum 551. The delivery cylinder 525 delivers the sheet P conveyed by the drum 551 to the drying device 530.

The leading end of the sheet P conveyed from the loading device 510 to the printing device 520 is gripped by a sheet gripper provided on a surface of the transfer cylinder 524 and is conveyed in accordance with the rotation of the transfer cylinder 524. The transfer cylinder 524 forwards the sheet P to the drum 551 at a position opposite (facing) the drum 551.

Similarly, the drum 551 includes a sheet gripper on the surface of the drum 551, and the leading end of the sheet P is gripped by the sheet gripper of the drum 551. A plurality of suction holes are dispersedly formed on the surface of the drum 551. The suction device 552 generates a suction airflow from the plurality of suction holes of the drum 551 toward an interior of the drum 551.

The sheet gripper of the drum 551 grips the leading end of the sheet P transferred from the transfer cylinder 524 to the drum 551, and the sheet P is attracted to and borne on the drum 551 by the suction airflows by the suction device 552. As the drum 551 rotates, the sheet P is conveyed.

The liquid discharge device 522 includes discharge units 523 (523A to 523D) to discharge liquids of each color, for example, yellow (Y), cyan (C), magenta (M), and black (K). For example, the discharge unit 523A discharges a liquid of cyan (C), the discharge unit 523B discharges a liquid of magenta (M), the discharge unit 523C discharges a liquid of yellow (Y), and the discharge unit 523D discharges a liquid of black (K), respectively.

The discharge units 523 may also include a discharge unit that discharges a special liquid such as white or gold (silver), or a treatment liquid such as a surface coating liquid.

The discharge units 523 includes full line heads and includes a plurality of heads 200 arranged in a staggered manner on a base 221. Each of the plurality of heads 200 includes a nozzle plate 201 that includes a plurality of nozzle rows (two rows in FIG. 25). Each of the plurality of nozzles rows in the head 200 includes a plurality of nozzles 202 arrayed in a longitudinal direction of the head 200 illustrated in FIG. 25. The longitudinal direction of the head 200 is perpendicular to the conveyance direction of the sheet P indicated by arrow in FIG. 25.

A discharge operation of each of the discharge units 523 of the liquid discharge device 522 is controlled by drive signals corresponding to print information. When the sheet P borne on the drum 551 passes through a region facing the liquid discharge device 522, the liquid of each color is discharged from the discharge units 523, and an image corresponding to the print information is printed on the sheet P.

The drying device 530 includes a drying mechanism 531 and a suction conveyance mechanism 532. The drying mechanism 531 dries the liquid adhered on the sheet P by the printing device 520. The suction conveyance mechanism 532 conveys (attracts and conveys) the sheet P while attracting the sheet P conveyed from the printing device 520.

After the sheet P conveyed from the printing device 520 is received by the suction conveyance mechanism 532, the sheet P is conveyed to pass through the drying mechanism 531 and delivered to the ejection device 540.

When the sheet P passes through the drying mechanism 531, the liquid on the sheet P is subjected to a drying process by drying mechanism 531. Thus, the liquid component such as water in the liquid evaporates and the colorant contained in the liquid is fixed on the sheet P. Further, curling of the sheet P is reduced.

The ejection device 540 includes an ejection tray 541 on which a plurality of sheets P are stacked. The sheets P conveyed from the drying device 530 are sequentially stacked and held on the ejection tray 541.

For example, the printer 500 may include a pre-processing unit to perform pre-processing of image formation on the sheet P. The pre-processing unit is disposed on an upstream of the printing device 520. Further, the printer 500 may include a post-processing unit that performs post-processing on the sheet P, to which the liquid is adhered, between the drying device 530 and the ejection device 540.

For example, the pre-processing unit may perform a pre-application process that applies a treatment liquid on the sheet P before image is printed on the sheet P. The treatment liquid reacts with the liquid to reduce bleeding of the liquid to the sheet P. However, the content of the pre-application process is not particularly limited to the process as described above. Further, the post-processing unit may perform a sheet reversing process and a binding process for binding a plurality of sheets P, for example. The sheet reversing process reverses the sheet P, on which image is printed by the printing device 520, and conveys the reversed sheet P again to the printing device 520 to print on both sides of the sheet P.

The above-described embodiments describe the printer 500 that prints an image on a cut sheet P. However, the printer 500 may also be applied to a printer that prints an image on a continuous material such as continuous paper.

Figure 26:
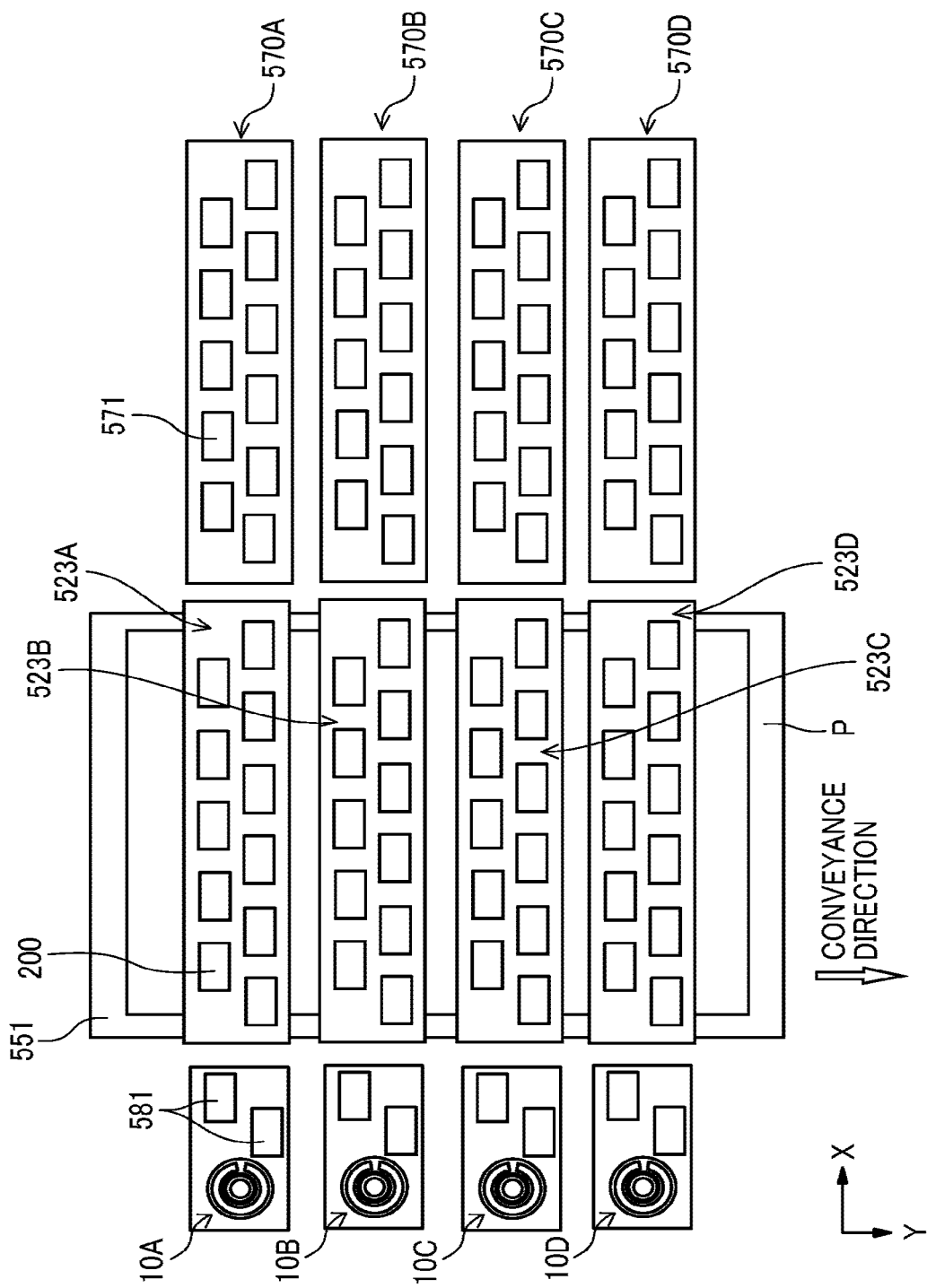
FIG. 26 is a plan view of an example of a printing device of the printer of FIG. 24.

Next, an example of a configuration of the printing device 520 in the printer 500 is described with reference to FIG. 26. FIG. 26 is a plan view of a printing device 520 according to the example in the thirteenth embodiment of the present disclosure.

As described above, the printing device 520 includes the discharge units 523 (523A to 523D) arranged around the drum 551.

The printing device 520 includes a cap device 570 (570A to 570D) including caps 571 to respectively cap the heads 200 of the discharge unit 523. The cap device 570 (570A to 570D) are reciprocally movable in an axial direction of the drum 551 that is a direction as indicated by arrow X (X-direction) in FIG. 26. The X-direction is parallel to a head arrangement direction in which the heads 200 are arranged. The X-direction is perpendicular to a conveyance direction indicated by arrow Y (Y-direction) in FIG. 26 in which the sheet P is conveyed.

When a nozzle surface 204 of the head 200 is capped by the cap 571 of the cap device 570, the discharge unit 523 ascends in a normal direction of the drum 551. Then, the cap device 570 enters a space below the discharge unit 523 (space between the discharge unit 523 and the drum 551), and the discharge unit 523 descends in the normal direction of the drum 551 toward the cap device 570.

Further, the printing device 520 includes a wiping and imaging device 580 that mounts wiping devices 581 and the liquid surface imaging device 10 (10A to 10D) according to the above-described embodiments. The wiping and imaging device 580 is reciprocally movable in the X direction. The wiping devices 581 wipe the nozzle surfaces 204 of the heads 200 of the discharge unit 523.

The discharge unit 523 ascends in the normal direction of the drum 551, and the wiping and imaging device 580 enters the space below the discharge unit 523 (space between the discharge unit 523 and the drum 551) and reciprocally moves in the X-direction to wipe the nozzle surfaces 204 of the heads 200 with a wiping member such as a web when the wiping devices 581 wipe the nozzle surfaces 204 of the heads 200.

When the liquid surface imaging device 10 images the image 320 on the liquid surface 301, the discharge unit 523 ascends in the normal direction of the drum 551, the wiping and imaging device 580 enters the space below the discharge unit 523 (space between the discharge unit 523 and the drum 551), and reciprocally moves in the X-direction to image the liquid surface 301 by the liquid surface imaging device 10.

Figure 27:
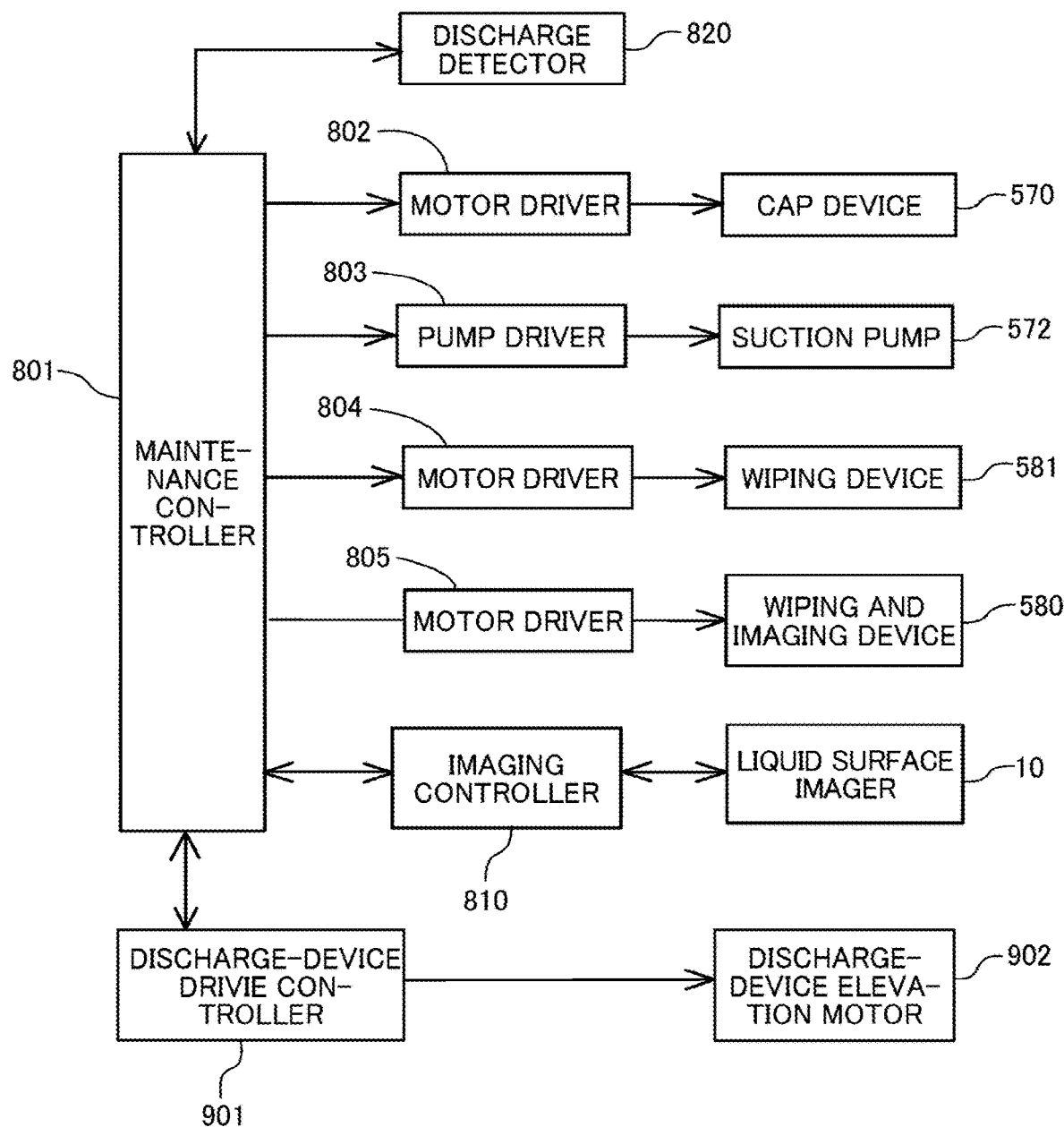
FIG. 27 is a block diagram of an example of a maintenance control of the printer of FIG. 24.

FIG. 27 is a block diagram of an example of a maintenance control of the printer 500 according to an embodiment of the present disclosure.

The printer 500 includes a maintenance controller 801 (circuitry) that controls the maintenance operation of the heads 200 in the printer 500. The maintenance controller 801 may be configured as a part of a controller (circuitry) of the printer 500, for example.

The maintenance controller 801 controls a reciprocal movement of the cap device 570 via a motor driver 802 and controls to drive a suction pump 572 connected to the cap 571 via a motor driver 803.

The maintenance controller 801 controls to drive the wiping devices 581 via a motor driver 804. For example, the maintenance controller 801 controls a movement of a web in the wiping device 581 via the motor driver 804.

The maintenance controller 801 controls a reciprocal movement of the wiping and imaging device 580 via a motor driver 805.

The maintenance controller 801 instructs an imaging controller 810 to perform an imaging operation and captures the imaging result. The imaging controller 810 controls imaging of the liquid surface 301 by the liquid surface imaging device 10.

The maintenance controller 801 instructs a discharge detector 820 to perform a discharge detection operation on the heads 200 and import a discharge detection result. The maintenance controller 801 controls the head 200 to discharge a liquid onto an electrode plate arranged in the cap 571 so that the discharge detector 820 detects a discharge state of the nozzle 202 from an electrical change on the electrode plate, for example.

The maintenance controller 801 controls to drive a discharge-device elevation motor 902 that ascends and descends the discharge unit 523 via a discharge-device drive controller 901.

Figure 28:
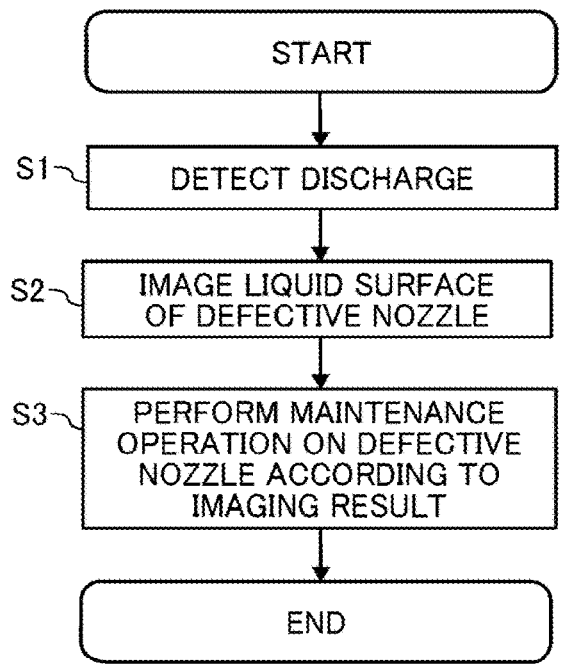
FIG. 28 is a flowchart of an example of control of the maintenance operation by the maintenance controller of the printer of FIG. 24.

FIG. 28 is a flowchart of an example of control of the maintenance operation by the maintenance controller 801 according to the thirteenth embodiment of the present disclosure.

The maintenance controller 801 causes the discharge detector 820 to perform discharge detection for each nozzle 202 of each head 200 of the discharge unit 523 (step S1). Hereinafter, the step S1 is simply referred to as "S1."

The maintenance controller 801 imports the discharge detection result from the discharge detector 820. The maintenance controller 801 determines presence or absence of a defective nozzle 202 (such as a non-discharge nozzle).

When the maintenance controller 801 determines that there is the defective nozzle 202, the maintenance controller 801 controls the wiping and imaging device 580 to move to face the nozzle 202 and instructs the imaging controller 810 to image the liquid surface 301 of the defective nozzle 202 with the liquid surface imaging device 10. The maintenance controller 801 images the liquid surface 301 in the defective nozzle 202 by the liquid surface imaging device 10 and captures the imaging result (S2).

Then, the maintenance controller 801 selects the maintenance operation according to the imaging result and controls the cap device 570 and the wiping device 581 to execute the selected maintenance operation on the defective nozzle 202 (S3).

The maintenance controller 801 may perform a head suction operation (nozzle suction operation) that cause the cap 571 to cap the nozzle surface 204 of the head 200 and further operates the suction pump 572 to suck and discharge the liquid from the nozzle 202 as a head suction operation (nozzle suction operation), for example. Further, the maintenance controller 801 may perform a dummy discharge operation (flushing or purge operation) that causes the head 200 to discharge the liquid from the nozzle 202 toward the cap 571. Further, the maintenance controller 801 may perform a wiping operation to wipe the nozzle surface 204 of the head 200 with the wiping device 581.

Thus, the maintenance controller 801 (circuitry) is configured to control the liquid surface imaging device 10 to image the liquid surface 301 and select one of a plurality of maintenance operations to be performed on the head 200 according to an imaging result of the liquid surface imaging device 10.

The maintenance controller 801 determines a state of the nozzle 202 from the imaging result of the liquid surface 301 of the nozzle 202 imaged by the liquid surface imaging device 10. Further, the maintenance controller 801 selects and executes the required maintenance operation from the above-described different maintenance operations.

Figure 29:
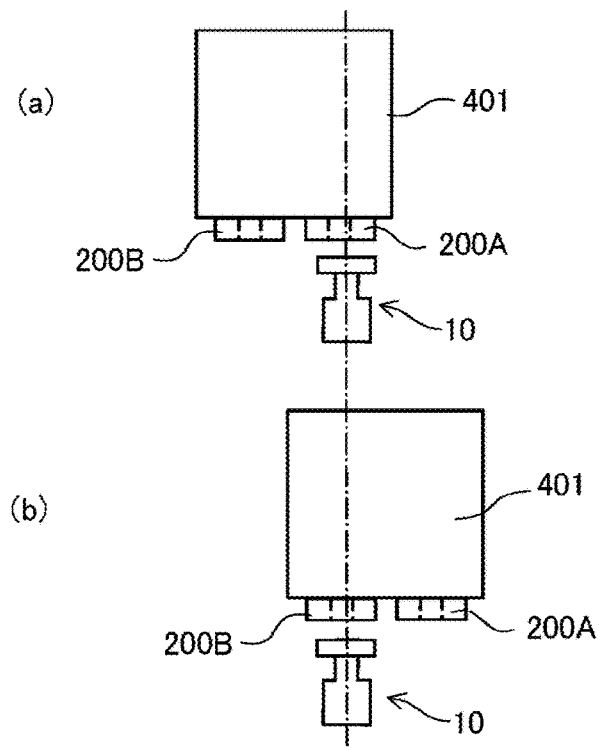
FIG. 29 is a schematic cross-sectional front view of a carriage of the printer which is a liquid discharge apparatus to discharge liquid according a fourteenth embodiment of the present disclosure.

A fourteenth embodiment according to the present disclosure is described with reference to FIG. 29. FIG. 29 is a schematic cross-sectional front view of a carriage 401 of the printer 500 which is a liquid discharge apparatus to discharge liquid according to the fourteenth embodiment.

The printer 500 includes the head 200 mounted on a carriage 401. The carriage 401 is reciprocally movable in the X-direction (see FIG. 26).

The maintenance controller 801 moves the carriage 401 relative to the liquid surface imaging device 10 in the X-direction so that the head 200A faces the liquid surface imaging device 10 when the printer 500 images the liquid surfaces 301 in the nozzles 202 of the head 200. Then, the liquid surface imaging device 10 images each of the liquid surfaces 301 in the nozzles 202 of the head 200A. Then, the maintenance controller 801 moves the carriage 401 to a position at which the head 200B faces the liquid surface imaging device 10. Then, the liquid surface imaging device 10 images each of the liquid surfaces 301 in the nozzles 202 of the head 200B.

As described above, the printer 500 according to fourteenth embodiment can reciprocally move the carriage 401 in the X-direction so that the liquid surface imaging device 10 faces the liquid surface 301 in the nozzle 202 of the head 200. Thus, the printer 500 can simultaneously irradiate and image a plurality of liquid surfaces 301 in the nozzles 202 of the heads 200.

Further, "liquid" discharged from the head is not particularly limited as long as the liquid has a viscosity and surface tension of degrees dischargeable from the head. However, preferably, the viscosity of the liquid is not greater than 30 mPa·s under ordinary temperature and ordinary pressure or by heating or cooling.

Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant. Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication.

Examples of an energy source in the head to generate energy to discharge liquid from the head include a piezoelectric actuator (a laminated piezoelectric element or a thin-film piezoelectric element), a thermal actuator that employs a thermoelectric conversion element, such as a heating resistor, and an electrostatic actuator including a diaphragm and opposed electrodes.

The term "liquid discharge apparatus" used herein also represents an apparatus including the head to discharge liquid by driving the head. The liquid discharge apparatus may be, for example, an apparatus capable of discharging liquid to a material to which liquid can adhere or an apparatus to discharge liquid toward gas or into liquid.

The "liquid discharge apparatus" may include devices to feed, convey, and eject the material on which liquid can adhere. The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The "liquid discharge apparatus" is not limited to an apparatus to discharge liquid to visualize meaningful images, such as letters or figures. For example, the liquid discharge apparatus may be an apparatus to form arbitrary images, such as arbitrary patterns, or fabricate three-dimensional images.

The above-described term "material on which liquid can adhere" represents a material on which liquid is at least temporarily adhered, a material on which liquid is adhered and fixed, or a material into which liquid is adhered to permeate. Examples of the "material on which liquid can adhere" include recording media, such as paper sheet, recording paper, recording sheet of paper, film, and cloth, electronic component, such as electronic substrate and piezoelectric element, and media, such as powder layer, organ model, and testing cell. The "material on which liquid can adhere" includes any material on which liquid can adhere, unless particularly limited.

The above-mentioned "material on which liquid can adhere" may be any material as long as liquid can temporarily adhere such as paper, thread, fiber, cloth, leather, metal, plastic, glass, wood, ceramics, or the like.

The "liquid discharge apparatus" may be an apparatus to relatively move the head and a material on which liquid can adhere. However, the liquid discharge apparatus is not limited to such an apparatus. For example, the liquid discharge apparatus may be a serial head apparatus that moves the head or a line head apparatus that does not move the head.

Examples of the "liquid discharge apparatus" further include a treatment liquid coating apparatus to discharge a treatment liquid to a sheet to coat the treatment liquid on a sheet surface to reform the sheet surface and an injection granulation apparatus in which a composition liquid including raw materials dispersed in a solution is discharged through nozzles to granulate fine particles of the raw materials.

The terms "image formation", "recording", "printing", "image printing", and "fabricating" used herein may be used synonymously with each other.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. For example, the maintenance controller 801 (circuitry) as described above may be implemented by one or more processing circuits or circuitry.

Numerous additional modifications and variations are possible in light of the above teachings. It is therefore to be understood that, within the scope of the above teachings, the present disclosure may be practiced otherwise than as specifically described herein. With some embodiments having thus been described, it is obvious that the same may be varied in many ways. Such variations are not to be regarded as a departure from the scope of the present disclosure and appended claims, and all such modifications are intended to be included within the scope of the present disclosure and appended claims.

What is claimed is:

1. A liquid surface imaging device comprising:
an irradiator including a plurality of lightings, the irradiator to irradiate a liquid surface in a nozzle of a liquid discharge head with lights emitted from the plurality of lightings; and
an imager to image the liquid surface,
wherein the plurality of lightings is point-symmetrical with a center of the irradiator as a point of symmetry.

2. The liquid surface imaging device according to claim 1, wherein the plurality of lightings is in a polygonal shape.

3. The liquid surface imaging device according to claim 1, wherein the plurality of lightings is annular.

4. The liquid surface imaging device according to claim 1, wherein the plurality of lightings includes a plurality of belt-shaped lightings.

5. The liquid surface imaging device according to claim 4, wherein the plurality of belt-shaped lightings is concentric.

6. The liquid surface imaging device according to claim 4, wherein the plurality of belt-shaped lightings is in a polygonal shape.

7. The liquid surface imaging device according to claim 4, wherein the plurality of belt-shaped lightings is annular.

8. The liquid surface imaging device according to claim 1, wherein the plurality of lightings is around a periphery of the imager.

9. The liquid surface imaging device according to claim 1, wherein the irradiator is movable toward or away from the liquid surface.

10. The liquid surface imaging device according to claim 1, further comprising:
a light source to emit light; and
a mirror to transmit the light emitted from the light source to the plurality of lightings of the irradiator.

11. The liquid surface imaging device according to claim 1, wherein:
the irradiator further includes at least one lighting, and
the at least one lighting and the plurality of lightings are concentric in a radial direction with the center of the irradiator as the point of symmetry.

12. A liquid discharge apparatus comprising:
the liquid surface imaging device according to claim 1; and
the liquid discharge head including the nozzle, the liquid discharge head to discharge a liquid from the nozzle.

13. The liquid discharge apparatus according to claim 12, further comprising:
a second nozzle, wherein the two nozzles are arrayed in a nozzle array direction, and
wherein the imager is movable relative to the two nozzles in the nozzle array direction.

14. The liquid discharge apparatus according to claim 12, wherein the imager images the liquid surface in the nozzle of the liquid discharge head at a position at which the imager faces the nozzle.

15. The liquid discharge apparatus according to claim 12, further comprising:
circuitry configured to:
control the liquid surface imaging device to image the liquid surface; and
select one of a plurality of maintenance operations to be performed on the liquid discharge head according to an imaging result of the liquid surface imaging device.

16. A liquid surface imaging device comprising:
an irradiator including a ring-shaped lighting, the irradiator to irradiate a liquid surface in a nozzle of a liquid discharge head with light emitted from the ring-shaped lighting; and
an imager to image the liquid surface,
wherein the ring-shaped lighting has a shape point-symmetrically with a center of the irradiator as a point of symmetry.

17. A liquid discharge apparatus comprising:
the liquid surface imaging device according to claim 16; and
the liquid discharge head including the nozzle, the liquid discharge head to discharge a liquid from the nozzle.

* * * * *